United States Patent [19]

Jeong

[11] Patent Number: 5,077,088
[45] Date of Patent: Dec. 31, 1991

[54] PROCESS FOR PREPARATION OF PIGMENT COATED PHOSPHOR

[75] Inventor: Jwa-young Jeong, Seoul, Rep. of Korea

[73] Assignee: Samsung Electron Devices Co., Ltd., Kyunggi, Rep. of Korea

[21] Appl. No.: 549,418

[22] Filed: Jul. 6, 1990

[30] Foreign Application Priority Data

Jul. 6, 1989 [KR] Rep. of Korea ............... 89-9628

[51] Int. Cl.$^5$ ............................................. B05D 7/24
[52] U.S. Cl. .................................. 427/218; 427/64; 427/68; 427/71
[58] Field of Search ............ 427/64, 68, 71, 201, 427/218, 219

[56] References Cited

U.S. PATENT DOCUMENTS

| 4,128,674 | 12/1978 | Hedler | 427/71 |
| 4,152,483 | 5/1979 | Kanda et al. | 427/71 |
| 4,695,478 | 9/1987 | Schulze et al. | 427/218 |
| 4,853,254 | 8/1989 | Wolfe | 427/64 |
| 4,859,497 | 8/1989 | Wolfe et al. | 427/64 |

FOREIGN PATENT DOCUMENTS

| 59-12537 | 1/1984 | Japan | 427/68 |
| 1188954 | 4/1970 | United Kingdom | 427/68 |

Primary Examiner—Shrive Beck
Assistant Examiner—Terry J. Owens
Attorney, Agent, or Firm—Cushman, Darby & Cushman

[57] ABSTRACT

A process for preparation of pigment coated phosphor comprises: preparing a phosphor solution by mixing an acryl emulsion and phosphor particles; preparing a pigment solution by mixing polyvinyl alcohol and pigment particles; mixing the two solutions; adding an acid solution to adjust the mixture to a pH of 3 to 7; and adding oxalic acid as a curing agent, thereby attaching the pigment particles to the phosphor particles.

4 Claims, 1 Drawing Sheet

PROCESS FOR PREPARATION OF PIGMENT COATED PHOSPHOR

FIELD OF THE INVENTION

The present invention relates to a process for the preparation of a pigment coated phosphor for use in a color cathode ray tube. More particularly, this invention relates to a pigment coated phosphor in which the distribution of the pigment coated is uniform, the pigment particles are well spread without flocculation, and compatibility with the compounding liquid is very high.

BACKGROUND OF THE INVENTION

Generally, pigment coated phosphors are widely used as the phosphor material for color cathode ray tubes because pigments having the body colors red, green, and blue can absorb the spectrums departing from the corresponding light wave length band of the phosphor thereby inhibiting the random reflection of the external lights at the screen film and improving the color contrasts.

If excessive amounts of the pigments are coated, however, the emission of the lights from the phosphor is impeded degrading the luminance of the picture. For this reason the amounts of the pigments have to be properly adjusted.

In this respect, the pigment coated phosphor has to have the following characteristics:
1) the adhesion between the pigment particle and the phosphor particle should be strong so that there should be no detachment from the surface of the phosphor during dispersing in the slurry;
2) the pigment particles should be uniformly spread on the surfaces of the phosphor particles, and the flocculation of the pigment particles should be negligible;
3) the pigments should be coated in proper amounts considering the lowering of the luminance and the reflectance of the phosphor particles after the coating of the pigments; and
4) there must be very high compatibility between the pigment coated phosphors and the compounding liquid.

The compounding liquid referred to herein means a liquid to be compounded with pigment coated phosphors to give slurry. The compounding liquid includes a binder such as polyvinyl alcohol, a photosensitizer for the binder such as ammonium dichromate, an organic filter resin, and a liquid vehicle such as water.

As enumerated below, there have been a number of manufacturing processes for the pigment coated phosphor to meet the above described requirements as mentioned in Japanese Laid-Open Patent Publication No. 50-56146, Japanese Patent Publication No. 51-80296 and U.S. Pat. No. 4049845.
1) Pigment particles coated with arabic rubber or polyvinyl pyrrolidone(PVP) are contacted with phosphor particles coated with gelatin.
2) The polyvinyl pyrrolidone and the gelatin used in process 1 are replaced by a water soluble acidic polymer and a water soluble basic polymer; and
3) An emulsion of acryl series is used.

In all of the above described conventional pigment coating processes a high viscosity organic bonding agent is used producing undesirable flocculation of the phosphor particles in large quantities.

Thus, if flocculation of the phosphor particles, an insufficiency of the compatibility between the compounding materials, or an insufficiency of the spreading within the compounding liquid occurs, it becomes impossible to obtain good quality phosphor dots or stripes. Further, a worse case can produce absolutely unacceptable phosphor because the adhered particles are not filtered during the sieving process of the compounded phosphor slurry through the use of a mesh.

In order to overcome this problem, multivalent ions are added to phosphors treated with the organic binders. Then the phosphors are subjected to the pH change and temperature change so that the organic binders are cured and the undesirable viscosity is removed. However, the resultant effect is not significant and no practical result has been obtained.

SUMMARY OF THE INVENTION

It is the object of the present invention to provide a process for preparation of a pigment coated phosphor for use in a color cathode ray tube, in which there is no flocculation of the phosphor particles even after the adhesion of the pigment particles, and to provide for high compatibility among the compounding liquid causing the spreading characteristics to be very superior.

To achieve the above object, the process for preparation of the pigment coated phosphor according to the present invention comprises:
1) preparing a dispersion solution which is formed by dispersing an acryl emulsion to phosphor particles;
2) preparing a dispersion solution which is formed by dispersing polyvinyl alcohol to pigment particles;
3) uniformly mixing said two dispersion solutions, adding an acid solution to the mixture thereof, and adjusting said mixture to pH 7 to 3; and
4) adding a proper amount of oxalic acid as a curing agent to said mixture, and adhering said pigment particles onto said phosphor particles.

The above described steps are carried out in the cited order.

The pigment coated phosphor according to the present invention may be in various kinds such as red, blue, green, yellow, and the like.

For example, the red phosphors include a europium activated yttrium oxy-sulphide phosphor ($Y_2O_2S$: Eu), a europium activated yttrium oxide phosphor ($Y_2O_3$: Eu), a europium activated yttrium vanadate phosphor ($YVO_4$: Eu), and other red emitting phosphors. The green phosphors include a copper activated zinc cadmium sulphide phosphor ((Zn, Cd) S: Cu), a copper activated zinc sulphide phosphor (ZnS: Cu), a copper and aluminum activated zinc sulphide phosphor (ZnS: Cu,Al), a zinc activated zinc oxide phosphor (ZnO: Zn), a silver activated zinc cadmium sulphide phosphor ((Zn, Cd)S: Ag), and other green emitting phosphors. The blue phosphors include a silver activated zinc sulphide phosphor (ZnS: Ag), a silver and aluminum activated zinc sulphide phosphor (ZnS: Ag,Al), a silver and chlorine activated zinc sulphide phosphor (ZnS: Ag,Cl), and other blue emitting phosphors. The average diameter of the respective phosphors should desirably be 3 to 15 $\mu$m.

As to the pigment particles which are used in preparing the pigment coated phosphor according to the present invention, the red pigments include $\alpha-Fe_2O_3$ combinations, cadmium sulfoselenide ($Cd(S_1-X, Se_x)$, where $0<x<1$), cadmium mercury red (CdS+HgS), red mercury sulphide (HgS) and the like. The green pigment, include colbalt oxide (CoO), zinc oxide (ZnO), chrome oxide ($Cr_2O_3$) and the like. The blue pigments include ultramarine ($3NaAl \cdot SiO_2 \cdot Na_2S_2$), prussian blue $Fe_4[Fe(CN)_6]_3 nH_2O$), cobalt blue (CoO $\cdot nAl_2O_3$), cupric sulphide (CuS), and the like.

The amount of the pigment particles versus the amount of the phosphor used in the present invention can vary depending on the types of phosphors, the types of pigment particles, and the desired increased range of reflectance. However, pigment particles are usually added in the amount of less than 15 parts by weight for 100 parts by weight of the phosphor, and preferably 0.05–10 parts by weight.

If the amount of the pigment particles added is less than 0.05 parts by weight no pigment coating effect can be obtained, but if the amount exceeds 10 parts by weight the luminance of the phosphor is significantly lowered.

BRIEF DESCRIPTION OF THE DRAWINGS

The above object and other advantages of the present invention will become more apparent by describing in detail the preferred examples of the present invention with reference to the attached drawing in which.

DESCRIPTION OF THE PREFERRED EMBODIMENTS

Figure 1:
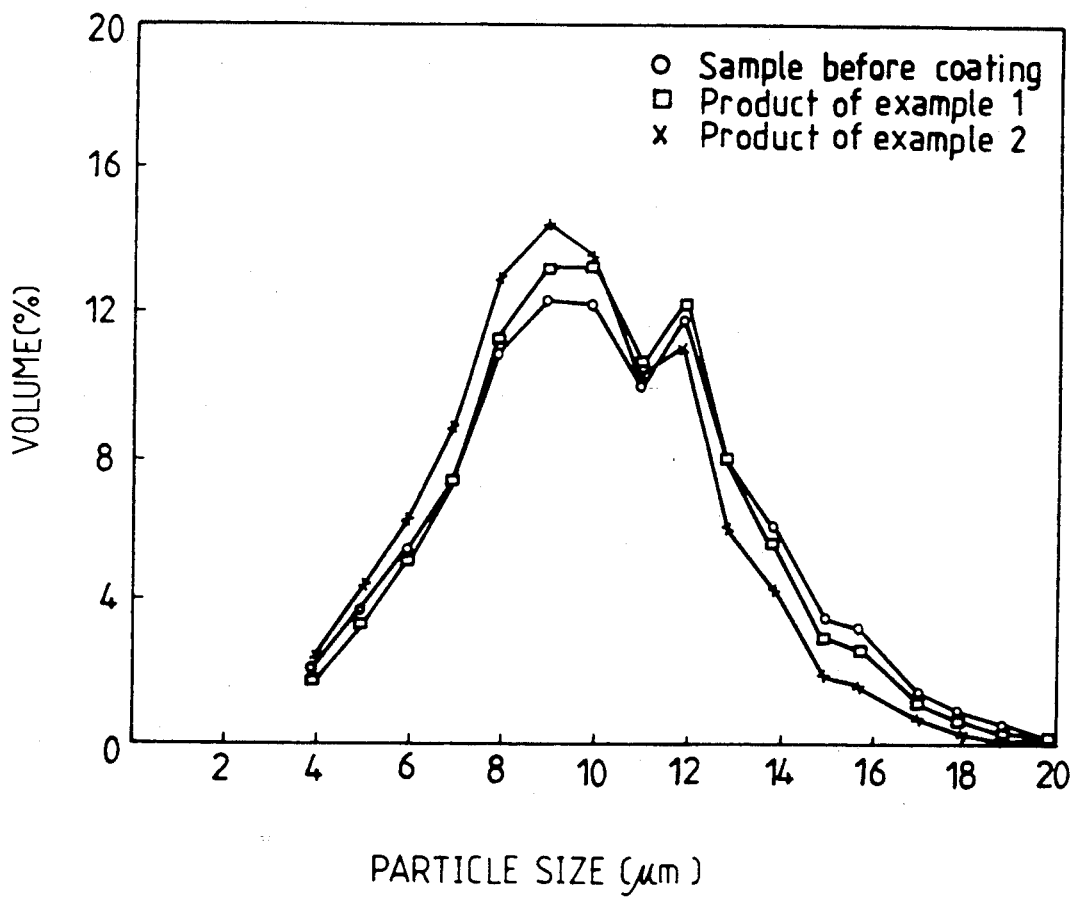
FIG. 1 is a graphical illustration comparing the distribution of the particle diameters of the phosphor before coating the pigment to the phosphor after coating the pigment according to the present invention.

Now the process for preparation of the pigment coated phosphor according to the present invention will be described in detail.

First, a water soluble mixture consisting of the phosphor and latex as a binder is prepared. That is, pure water and the phosphor are sufficiently mixed by agitating them in an agitator. A proper amount of acryl emulsion is then added into the mixture. The mixture is then sufficiently mixed for a considerable period of time, and a pigment dispersion mixed with polyvinyl alcohol is added.

The mixture is then mixed together for a proper period of time, and its pH is adjusted to pH 7 to 3 by adding acetic acid, nitric acid, hydrochloric acid, sulphuric acid and the like. Next a curing agent is added, and a cleaning, drying, and sieving are carried out to obtain the pigment coated phosphor of the present invention which has high spreading characteristics.

The above mentioned curing agent becomes different depending on the type of latex used. If acryl emulsion is used as the binder, oxalic acid is used as the curing agent in the amount of 0.001–1.0 part by weight for 100 parts by weight of the phosphor, and preferably 0.01 –0.5 part by weight.

If the amount of oxalic acid added is less than 0.01 part by weight, its effect is too meager, while, if it exceeds 1.0 part by weight, the exceeded amount brings no particular additional effects.

Also, the amount of the polyvinyl alcohol is 0.001 to 1 part by weight as against 100 parts by weight of said phosphor, and the amount of the acryl emulsion is 0.005 to 1 part by weight as against 100 parts by weight of said phosphor.

The pigment coated phosphor manufactured according to the process of the present invention as described above has the following characteristics: that the viscosity of the binder is reduced; uniform dispersion of the phosphor particles within the compounding liquid is achieved; and, the filtering time for the combining liquid is shortened through the uniform distribution of spreading of the phosphor particles thereby making it possible to obtain a satisfactory pigment coated phosphor.

In other words, the particle diameter and the particle size are the same before and after the coating of the pigment, there is no flocculation of the particles so that a uniform phosphor layer having an excellent dispersion can be formed, and the luminance of the panel of the cathode ray tube can be improved.

EXAMPLE 1

Blue phosphors (ZnS: Ag, Cl) in the amount of 100 g were put into 500 ml of pure water, and were sufficiently dispersed by means of an agitator. Then, an acryl emulsion was added in the amount of 0.4 ml. Then the mixture was sufficiently agitated and left alone to allow precipitation to be carried out before the supernatant liquor was removed by inclining it.

Pure water was then added as high as the original liquid level, an agitation was carried out, and pigment dispersed solution was added.

The above mentioned pigment dispersed solution was prepared in the following manner. 2 g of pigment material was crushed for a couple of days by means of a ball mill and dilution was carried out by adding pure water. This solution was subjected to dispersion by means of an agitator, and 0.2 ml of polyvinyl alcohol solution was added before they were uniformly mixed together.

After adding the pigment dispersed solution which was prepared as described above, a sufficient agitation was carried out so that the pigment dispersed solution mixed with polyvinyl alcohol and the phosphor solution mixed with the acryl emulsion. Then the mixture was adjusted to pH 7 by adding acetic acid completing the coating of the pigment.

Finally, a sufficient agitation was carried out and 0.2 g of oxalic acid, which is a curing agent, was added after diluting it in pure water so that the adhesive property of acryl emulsion was removed. Cleanings were carried out twice, dewatering, drying, and sieving were done.

The blue pigment coated phosphor prepared based on the above described process showed a uniform pigment coating state, an excellent dispersion, no flocculation at all, and resulted in the distributions of the particle diameters and the particles sizes of the phosphors before and after the coating of the pigments being the same and showing no difference. (see Table 1 below and FIG. 1).

TABLE 1

| | Data for particle diameter (measured with Elzon 180 XY) | | |
|---|---|---|---|
| Samples | Middle value | Average value | Most frequent value |
| before coating | 10.60 μm | 10.23 μm | 10.87 μm |
| after coating (Example 1) | 10.54 μm | 10.24 μm | 10.42 μm |

Meanwhile, the filtering time for the phosphor compounding liquid of the present invention was measured, and it was discovered that the phosphor prepared by adding the curing agent gave an improved result over the phosphor which was prepared without using the curing agent. (see Table 2).

TABLE 2

| Sample | Filtering time (time required for 50 cc of compounding liquid to pass 400 mesh) Filtering time (sec) |
|---|---|
| Product prepared by conventional process | 45 |
| Product of Example 1 | 40 |

EXAMPLE 2

The procedure was carried out in the same manner as that of Example 1, except that the amount of acryl emulsion was reduced to 0.2 ml, and the amount of polyvinyl alcohol was increased to 0.4 ml to give a blue pigment coated phosphor.

The blue pigment coated phosphor thus prepared showed no flocculation so the distributions of particle diameters of the phosphors before and after the coating of the pigments were almost the same as in Example 1. (See Table 3 and FIG. 1)

TABLE 3

| Samples | Data for particle diameter (measured with Elzon 180 XY) | | |
|---|---|---|---|
| | Middle value | Average value | Most frequent value |
| Before coating | 10.60 μm | 10.23 μm | 10.87 μm |
| After coating (Example 2) | 10.01 μm | 9.67 μm | 10.40 μm |

EXAMPLE 3

The procedure was carried out in the same manner as that of example 2, except the amount of α—$Fe_2O_3$ used as red pigment was 0.16% by weight as against 100% by weight of $Y_2O_2S$: Eu phosphor to give red pigment coated phosphor. Also, the phosphor thus obtained had an excellent dispersion characteristics.

FIG. 1 is a graphical illustration comparing the distributions of the particle diameters of the phosphor before coating the pigment to the phosphor after coating it, wherein O indicates the phosphor before coating the pigment, □ indicates the phosphor obtained from example 1 and X indicates the phosphor obtained from example 2.

As can be seen from FIG. 1, the pigment coated phosphors prepared according to the present invention exhibit excellent dispersion characteristics with 10 to 14% in volume change before and after coating of pigment within the range of 8 to 12 μm of the particle size.

What is claimed is:

1. A process for preparation of a pigment coated phosphor, comprising:
    preparing a first dispersion solution by mixing an acryl emulsion and phosphor particles;
    preparing a second dispersion solution by mixing polyvinyl alcohol and pigment particles;
    uniformly mixing said first and second dispersion solutions, adding an acid solution to the mixture thereof, and adjusting the pH of said mixture between 3 and 7; and
    adding oxalic acid as a curing agent to said mixture, thereby adhering said pigment particles onto said phosphor particles, the above described steps being carried out in the cited order.

2. The process for preparation of a pigment coated phosphor according to claim 1, wherein the amount of said oxalic acid is in the range of 0.01 to 0.5 parts by weight for 100 parts by weight of said phosphor.

3. The process for preparation of a pigment coated phosphor according to claim 1, wherein the amount of said acryl emulsion is in the range of 0.005 to 1 parts by weight for 100 parts of weight of said phosphor.

4. The process for preparation of a pigment coated phosphor according to claim 1, wherein the amount of said polyvinyl alcohol is in the range of 0.001 to 1.0 parts by weight for 100 parts by weight of said phosphor.

* * * * *